DEFLECTION CORRECTOR CIRCUIT FOR CATHHODE RAY TUBE

Filed April 30, 1968

2 Sheets-Sheet 1

INVENTOR
RICHARD J. KLENSCH

BY John T. O'Halloran

ATTORNEY

May 12, 1970 R. J. KLENSCH 3,512,039

DEFLECTION CORRECTOR CIRCUIT FOR CATHHODE RAY TUBE

Filed April 30, 1968 2 Sheets-Sheet 2

INVENTOR

RICHARD J. KLENSCH

BY John T. O'Halloran

ATTORNEY

United States Patent Office 3,512,039
Patented May 12, 1970

3,512,039
DEFLECTION CORRECTOR CIRCUIT FOR CATHODE RAY TUBE

Richard J. Klensch, Trenton, N.J., assignor to RCA Corporation, a corporation of Delaware Filed Apr. 30, 1968, Ser. No. 725,422
Int. Cl. H01j *29/72*
U.S. Cl. 315—24 5 Claims

ABSTRACT OF THE DISCLOSURE

A corrector circuit improves the linearity of deflection of a scanning beam of a cathode ray tube by providing both on-axis correction and off-axis correction for the two coordinate deflection signals. An on-axis corrector produces increasing attenuation in the same axis deflection signal as this selfsame signal increases in magnitude, whereas an off-axis corrector produces further increasing attenuation of the said same axis deflection signal as the other coordinate deflection signal increases in magnitude.

Background of the invention

Mechanical and photographic techniques of composing type are relatively slow and the probability of increasing the speed of such type composition systems by a significant amount appears to be small. The successful transformation of type composition into an electronic art promises to increase greatly the speed of type composition.

Recently, electronic photocomposition systems have become commercially available. Such systems utilize an imaging device, such as a flat-faced cathode ray tube, to create characters by a plurality of adjacent scanlines that form slices of the character. The characters are focused onto photographic film for recording thereon and then subsequently processed into printing plates. Such systems tend to form one, or a few lines of type, at a time before the photographic film is moved to the next position.

It is better to be able to form an entire page of type at a time on the face of the cathode ray tube. Such operation significantly increases the speed of type composition and also avoids the alignment problems associated with the periodic movement of the photographic film. However, the problem of "pin-cushion" distortion arises. Troublesome pin-cushion distortion is created when the scanning beam of the cathode ray tube is deflected appreciably from the geometric center of the face of the tube. Such distortion tends to severely distort the characters formed at the extremities of the face of the tube and also makes them appreciably larger than the characters formed at the center of the face of the tube. Such distortion prevents high graphic quality characters from being formed when the entire face of the tube is being utilized for type composition.

Curved tubes canont be used as the imaging device because the subsequent optical projection of the characters onto photographic film introduces equal if not worse distortion. Correction circuits designed for television receivers are not readily useful in photocomposition systems because higher accuracy is needed to produce graphic characters of predetermined point sizes, font styles, etc. than is required in dynamic television pictures.

Summary of the invention

A corrector circuit for providing deflection of a scanning beam in a cathode ray tube that is deflected in response to X axis and Y axis deflection signals include on-axis correction means coupled to atenuate the same axis deflection signal in successively higher levels at the same axis deflection signal increases in magnitude to preselected values, and off-axis correction means coupled to reduce said preselected values of said same axis deflection signal in predetermined steps as a function of the increase in magnitude of the other coordinate axis deflection signal.

Detailed description

Figures 1, 2, 3:
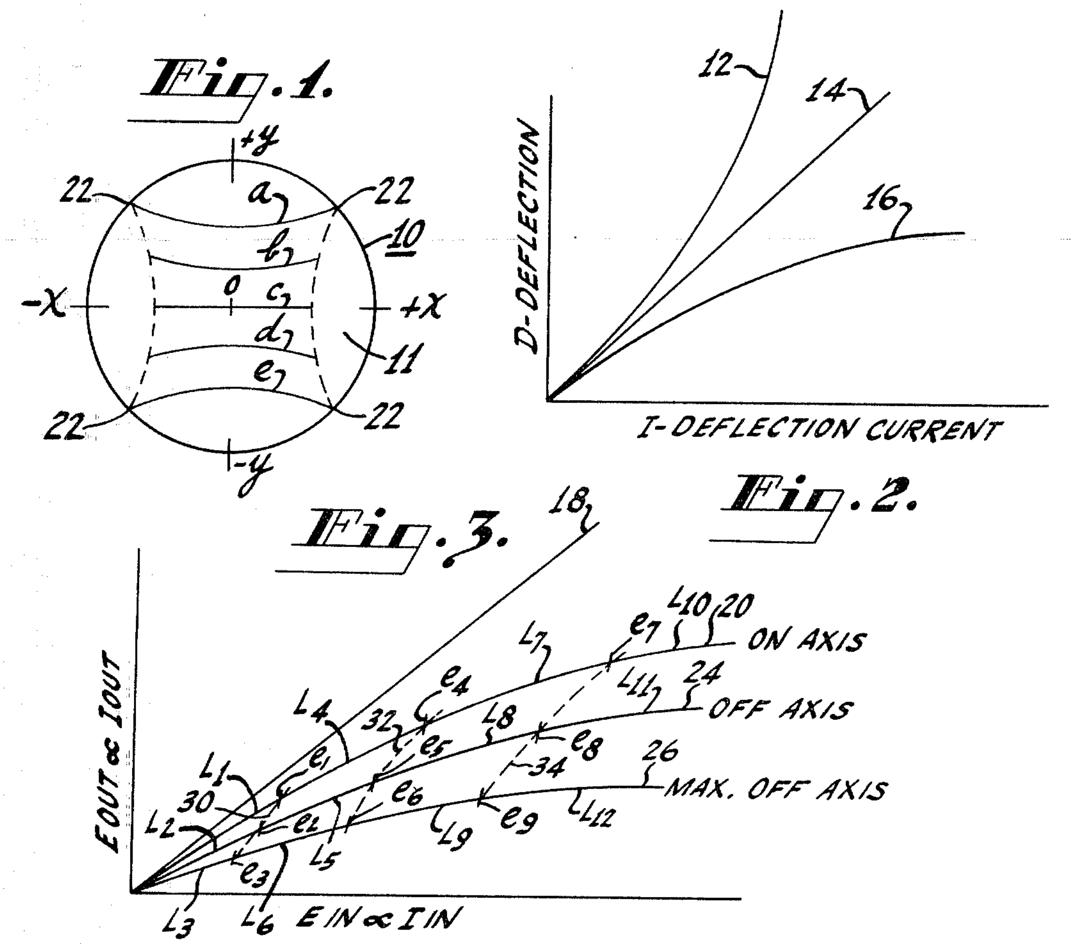
FIG. 1 is a graphic representation of a cathode ray tube exhibiting pin-cushion distortion.
FIG. 2 is a graph illustrating the deflection and distortion correction characteristics of a cathode ray tube.
FIG. 3 is a series of graphic characteristics illustrating the correction necessary to provide substantially linear deflection in a cathode ray tube.

In FIG. 1, there is shown a flat face 11 of a cathode ray tube 10 having electromagnetic deflection circuits wherein pin-cushion distortion is present. Each of the scanlines *a, b, c, d,* and *e* should be of equal length and equally distant from each other. However, the pin-cushion distortion present causes those scanlines that are deflected the most to exhibit the greatest nonlinearity. As the deflection angle increases, the distortion increases. The distortion is present in both the X and Y coordinate axis directions.

In FIG. 2, there is shown a characteristic curve 12 that illustrates the actual deflection D of a scanning beam versus the deflection signal current I applied to cause this deflection. It is to be noted from the curve 12 that as the deflection current I increases, the deflection of the scanning beam increases disproportionately more and hence the deflection is nonlinear. Thus, the distortion increases as the deflection signal current increases. The curve 12 deviates appreciably from the ideal linear deflection curve 14. To attain the ideal curve, it is necessary that compensation or correction, as indicated by the curve 16, be introduced into the deflection system so that the combination creates the resultant ideal characteristic curve 14. Since pin-cushion distortion causes the actual deflection to be too large at higher magnitudes of the deflection silgnals, linearity is achieved by reducing the deflection current in a manner indicated by the curve 16. This is accomplished by attenuating the deflection signal more and more as the deflection signal increases in amplitude. Such increasing attenuation produces the proper compensation to attain linear deflection of the scanning beam.

In FIG. 3, there is shown a series of input-output characteristic curves of the deflection signals for X axis deflection in a corrector circuit embodying the invention. A similar set of curves exists for the Y axis. The following description is limited to the X axis because the Y axis operation is identical. With no reproduction or attenuation of the deflection signal, the input-output characteristic is substantially equivalent to the characteristic 18. When the scanning beam is deflected on-axis, i.e., the input deflection signal only deflects the scanning beam in the X axis direction of the face of the tube 10, then the correction to be introduced into the system is shown by the characteristic curve 20. When the scanning beam is deflected in the Y axis direction as well as the X axis direction, then more correction is required since both the X and Y deflection signals contribute to the distortion. The actual deflection of the scanning beam when both X axis and Y axis deflection signals are present is greater than just the vector sum of these two coordinate deflections (i.e., the hypothenuse). This is the reason for the formation of the cusps 22 shown in FIG. 1. For correction of such additional distortion created by off-axis deflection, the introduction of the attenuation represented by the characteristic curve 24 is required. For maximum off-axis deflection, the attenuation represented by the curve 26 is necessary to correct for the distortion.

It is to be noted that the portions $L_1$ through $L_{12}$ of the characteristic curves 20, 24, and 26 are approximately straight lines. The approximate straight line portions $L_1$, $L_4$, $L_7$, etc. of the characteristic curve 20 effectively define the different attenuation levels that must be introduced into the X axis input deflection signal to provide linear on-axis deflection. Similarly, the portions $L_2$, $L_5$, and $L_8$, etc. of the curve 24 and the portions $L_3$, $L_6$, and $L_9$ etc. of the curve 26 define the attenuation levels that should be introduced into the X axis deflection signal when the scanning beam is deflected off the X axis.

It is also to be noted that the portions $L_4$ through $L_9$ of the curves 20, 24, and 26 are set off by corresponding breakpoints $e_1$ through $e_9$. These breakpoints $e_1$ through $e_9$ define the X axis deflection signal voltage amplitudes at which the attenuation levels begin and end. It is also to be noted that corresponding portions of the curves 20, 24, and 26 such as $L_1$, $L_2$, and $L_3$, as well as $L_4$, $L_5$, and $L_6$ are substantially parallel to each other and hence define identical attenuation levels. The breakpoints $e_1$, $e_2$, and $e_3$, defining the ends of the attenuation levels $L_1$, $L_2$, and $L_3$, are therefore decreasing steps of magnitudes of the X axis deflection signal required to introduce the same attenuation level as the scanning beam is deflected further off the X axis. Hence, for increasing off-axis deflection, the same attenuation levels are introduced into the X axis deflection signal but at an earlier time. It is also to be noted that the dotted curves 30, 32, and 34 joining the breakpoints $e_1$ through $e_9$ are not identical to each other. Thus, there is no simple relationship between them that can be utilized to provide a simple physical formulation thereof. A set of curves similar to 20, 24, and 26 exist for Y axis correction and the above description also applies thereto.

Figure 4:
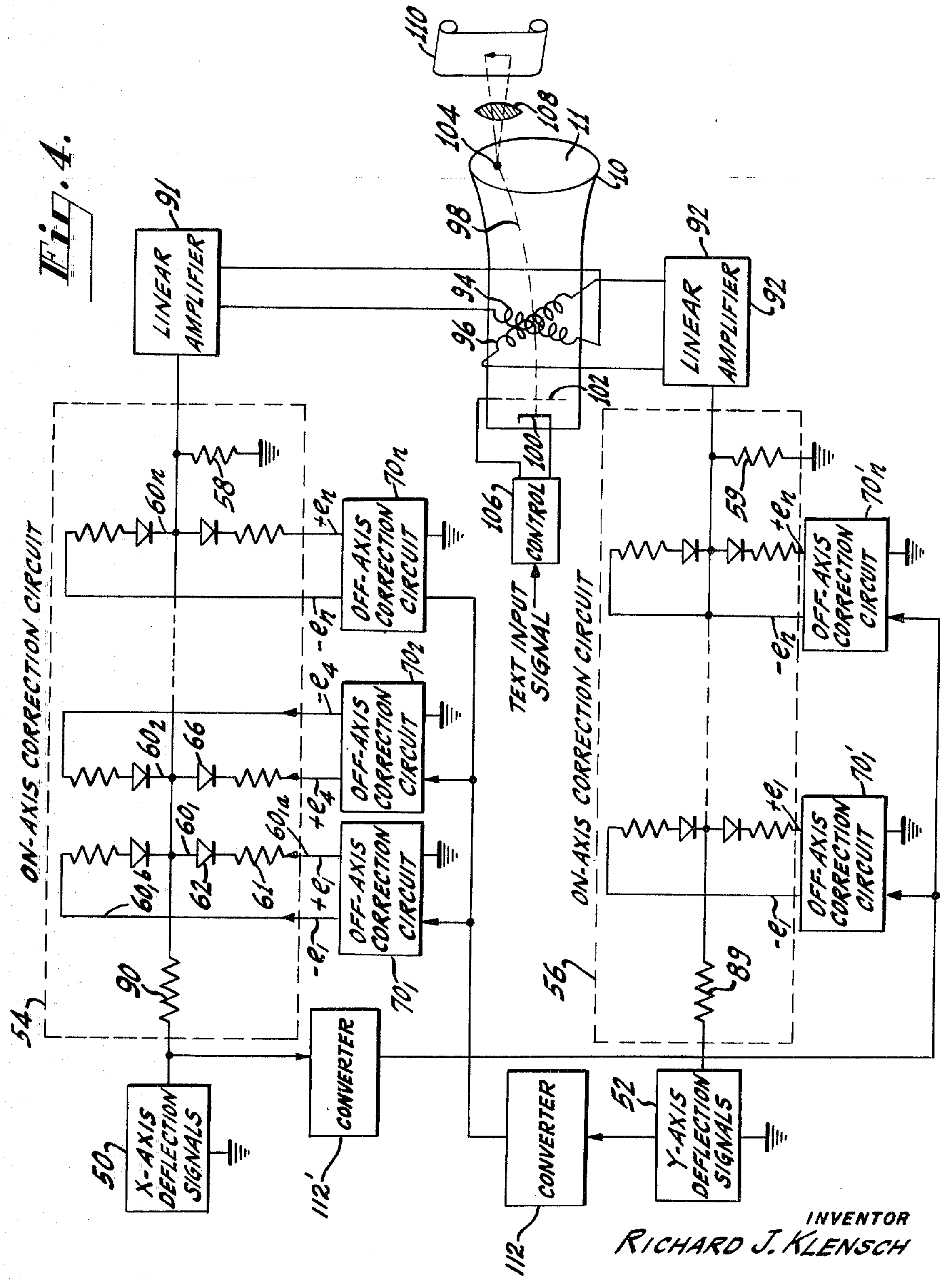
FIG. 4 is a schematic block diagram of a deflection corrector circuit embodying the invention.

Referring now to FIG. 4, there is shown a block diagram of a deflection system incorporating corrector circuits for implementing the attenuation curves shown in FIG. 3. In the deflection system, the X axis deflection signals are derived from a source of deflection signals 50, whereas the Y axis deflection signals are derived from a source 52. The X axis deflection signals are applied to an on-axis correction circuit 54, whereas the Y axis deflection signals are applied to an on-axis correction circuit 56. Both the X and Y on-axis correction circuits 54 and 56 effectively attenuate the on-axis deflection signals as these deflection signals increase in magnitude, in a manner shown by the on-axis characteristic curve 20 in FIG. 3.

The on-axis correction circuits 54 and 56 are identical and hence only the circuit 54 will be described in detail. The X on-axis correction circuit 54 includes a plurality of parallel attenuating networks $\mathbf{60}_1$ through $\mathbf{60}_n$. Each attenuating network includes a positive deflection signal path such as the path $\mathbf{60}_{1a}$ and a negative deflection signal path such as $\mathbf{60}_{1b}$ in network $\mathbf{60}_1$. Each positive and negative attenuating path includes a resistor that functions as an attenuator such as the resistor 61 in path $\mathbf{60}_{1a}$, and a unidirectional conducting device that functions as a switch, such as the diode 62. Each of the attenuator networks is biased by positive and negative biasing signals in a manner to back bias the diodes therein. Thus, in the first attenuating network $\mathbf{60}_1$, the positive signal attenuator path $\mathbf{60}_{1a}$ is biased by a voltage $+e_1$ and the negative signal attenuator path $\mathbf{60}_{1b}$ is biased by a voltage $-e_1$. The positive and negative back-biasing voltages are the inverse of one another and hence are of the same magnitude but opposite in sign or polarity. The positive and negative back-biasing voltages are derived from a plurality of off-axis correction circuits $\mathbf{70}_1$ through $\mathbf{70}_n$. Each of the off-axis correction circuits is coupled to a corresponding attenuator network.

An X axis deflection signal is applied to its on-axis correction circuit 54 through a resistor 90 and the same X axis deflection signal is also applied to the off-axis correction circuits $\mathbf{70'}_1$ through $\mathbf{70'}_n$ for the Y axis. The X axis deflection signal comprises the coordinate axis deflection signal for the Y off-axis correction circuits $\mathbf{70'}_1$ through $\mathbf{70'}_n$. The Y axis deflection signal is similarly applied to the Y on-axis correction circuit 56 through a resistor 89 and to the X off-axis correction circuits $\mathbf{70}_1$ through $\mathbf{70}_n$.

A corrected X axis deflection singal is developed across resistor 58 at the output of the corrector circuit 54 and applied to a linear driver amplifier 91. Similarly, a corrected Y axis deflection signal is developed across resistor 59 at the output of the correction circuit 56 and applied to a linear driver amplifier 92. The driver amplifiers 91 and 92 are coupled to horizontal 94 and vertical 96 deflection coils of the cathode ray tube 10.

The cathode ray tube 10 produces an electron beam 98 that emanates from a cathode 100 under the control of a control grid 102. The electron beam is projected onto the face 11 of the acthode ray tube 10 so as to form in conjunction with the phosphor thereon a scanning spot 104. The scanning spot 104 is deflected in a predetermined manner by the deflection current in the horizontal and vertical deflection coils 94 and 96. The various portions of the scanlines that form slices of characters on the face of the tube 10 are determined by a control circuit 106 that is coupled to the control grid 102 and cathode 100 of the tube 10. A text input signal for selecting particular characters to be formed is applied to the control circuit 106. The light emanating from scanning spot 104 is imaged by a lens system, shown as a single convex lens 108 in FIG. 1 onto photographic film 110. The photographic film 110 is processed subsequently into a printing plate.

Operation of on-axis correction circuits

It is assumed in this description of on-axis correction that only an X deflection signal is available. When an X axis deflection signal is applied to the on-axis corrector circuit 54, the circuit 54 attenuates the X deflection signal in accordance with the characteristic curve 20 in FIG. 3. The attenuation causes the physical deflection of the scanning beam 98 in the X axis direction to be reduced by the correct amount necessary to cause equal physical deflection of the scanning spot 104 on the face 11 of the tube 10 for equal differential changes in the X axis deflection signal from source 50.

For low values of X axis deflection signals, none of the diodes in the attenuator networks $\mathbf{60}_1$ through $\mathbf{60}_n$ is forward biased and hence the deflection signal develops an unattenuated output signal across the resistor 58. The diodes do not conduct because the back-biasing voltage applied to each attenuator network $\mathbf{60}_1$ through $\mathbf{60}_n$ from the off-axis correction circuits $\mathbf{70}_1$ through $\mathbf{70}_n$, in the absence of a Y axis deflection signal, are selected to be higher than low values of X axis deflection signals.

As the X axis deflection signal increases in magnitude, the voltage thereof exceeds the back-biasing voltage $e_1$. Consequently, the diode 62 in the attenuation network $\mathbf{60}_1$ becomes forward biased and the attenuating resistor 61 is introduced into the path of the deflection signal. A portion of the X axis signal is diverted away from the output resistor 58 and hence from the deflection coil 94. The attenuation level $L_4$ is therefore introduced into the on-axis deflection signal.

As the X axis deflection signal increases further in magnitude, the back-biasing voltage $e_4$ is exceeded and the diode 66 becomes forward biased. The attenuation level $L_7$ is therefore introduced into the X axis deflection signal. As the X axis deflection signal increases still further in magnitude, the various breakdown points of the diodes in the attenuator networks are reached and more and more attenuation is introduced into the X axis deflection signal. By increasing the number of attenuator networks, an almost exact on-axis deflection correction can be attained.

Description of off-axis correction circuit

Figure 5:
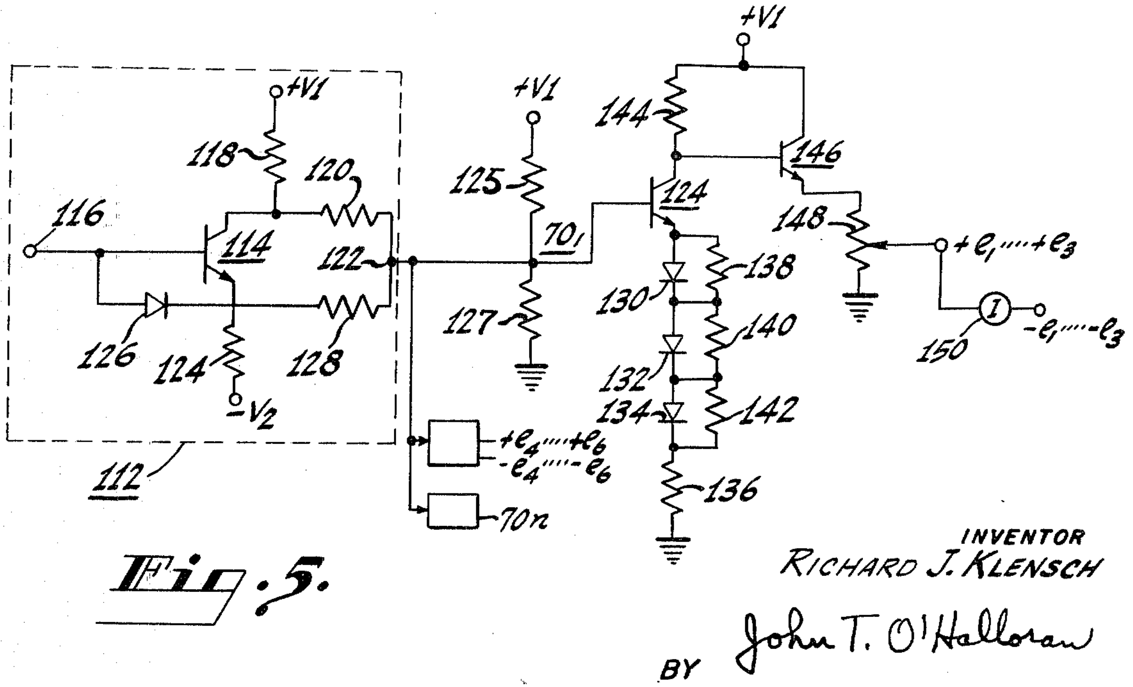
FIG. 5 is a schematic circuit diagram of an off-axis correction circuit embodied in the diagram of FIG. 4.

Referring now to FIG. 5, there is shown a schematic circuit diagram of a representative one of the off-axis corrector circuits $70_1$ . . . $70_n$. Since both the X and Y off-axis correction circuits are identical, only the X off-axis circuits are described. Similarly, the correction circuit $70_1$ is substantially identical to the other off-axis correction circuits, and hence only the circuit $70_1$ is illustrated in detail. Common to all of the off-axis correction circuits $70_1$ through $70_n$ is a bipolar-to-unipolar converter 112 that includes an input transistor 114 to which the bipolar Y axis deflection input signals are applied. Accordingly, the input terminal 116 is coupled to the Y axis deflection signal source 52 (FIG. 4). The input transistor 114 includes a base electrode coupled to the input terminal 116 and a collector electrode coupled through a load resistor 118 to a source of positive potential $+V_1$, as well as through a resistor 120 to an output junction 122. The transistor 114 also includes an emitter coupled through a resistor 124 to a source of negative potential $-V_2$. The input terminal 116 is also coupled by means of a forwardly poled diode 126 and a resistor 128 to the junction point 122.

The transistor 114 is normally turned on and saturated as a result of the biasing supplies $+V_1$ and $-V_2$. When a positive Y axis deflection signal is applied to the input terminal 116, the positive input signal is effectively passed by the diode 126 and resistor 128 to the output junction point 122. When a negative Y axis deflection signal is applied to the terminal 116, the negative signal tends to reverse bias the base emitter junction of the transistor 114, thereby reducing the collector current. The collector voltage therefore rises and hence the junction point 122. The unipolar signals are applied to all of the correction circuits $70_1$ through $70_n$.

The unipolar signal is coupled to the base electrode of a variable gain amplifier transistor 124. The base electrode is biased by means of voltage divider resistors 125 and 127 coupled between the power supply $V_1$ and circuit ground. The emitter electrode of the variable gain amplifier 124 is coupled through a plurality of forwardly poled diodes 130, 132, and 134, as well as a resistor 136 to ground. Each of the diodes 130, 132, and 134 is shunted by a resistor 138, 140, and 142, respectively. The collector electrode of the transistor 124 is coupled through a load resistor 144 to the power supply $+V_1$.

The collector of the transistor 124 is also coupled to the base electrode of an emitter-follower transistor 146. The collector of the transistor 146 is directly coupled to the power supply $+V_1$, whereas the emitter electrode is coupled through an output potentiometer 148 to circuit ground. A tap on the potentiometer 148 supplies the preselected step biasing voltages $e_1$, $e_2$, $e_3$, etc. An inverter 150 supplies the negative step biasing voltages $-e_1$, $-e_2$, $-e_3$, etc.

When a Y axis deflection signal is present in addition to the X axis deflection signal, the attenuation introduced into the X axis deflection signal is represented, for example, by the curves 24 and 26 in FIG. 3. As the Y axis deflection signal rises from zero, the output voltage at the potentiometer 148 decreases from $e_1$ down to $e_3$, etc. Thus, as shown in FIG. 3, the values at which attenuation is introduced into the X axis deflection signal is lowered as the Y axis deflection signal increases.

Initially, with no Y axis deflection signal applied to the input terminal 116 (FIG. 5), the converter transistor 114 is conducting but the variable gain transistor 124 is biased off. The emitter-follower transistor 146 is conducting and the output biasing voltages $+e_1$, and $-e_1$ are available. When a positive Y axis deflection signal is applied, the diode 126 passes the signal to the junction 122 and biases the amplifier transistor 124 to conduction. As the input signal increases, the current conduction through the emitter of the transistor 124 causes the largest resistor, e.g., 138, to exceed the forward bias "knee" voltage of the diode 130 and the diode conducts, shunting out the resistor 138 in the current conduction path of the transistor 124. The gain of the transistor 124 increases and the output voltage decreases. Hence, the output voltage $+e_2$, as well as $-e_2$ are now available.

Similarly, when the coordinate axis deflection signal, i.e., the Y axis deflection signal, increases further and further, the diodes 132 and 134 in the diode chain become forward biased and provide decreasing step output voltages from the amplifier 124. The number of diodes in the diode chain and the values of the resistors shunting these diodes are selected to provide the proper steps to shift from the characteristic curve 20 to the curve 24, etc. at the breakpoints $e_1$, $e_2$ . . . $e_n$.

The diodes and shunting resistors in the other off-axis correction circuits $70_2$ through $70_n$ are selected to provide the step voltages $e_4$, $e_5$, $e_6$, and $e_7$, $e_8$, $e_9$, etc. It is therefore apparent that by properly selecting the correct number and values of the components in the on-axis and off-axis correction circuits that correction to linear deflection is obtainable.

Thus, in accordance with the invention, a corrector circuit that provides linear deflection of a cathode ray tube scanning beam is provided which exhibits both on-axis and off-axis correction.

What is claimed is:

1. A corrector circuit for providing substantially linear deflection of a scanning beam in a cathode ray tube wherein said scanning beam is deflected in response to coordinate X axis and Y axis deflection signals, comprising in combination:

on-axis correction means including a plurality of attenuator networks for producing in a same axis deflection signal a plurality of successively higher levels of attenuation corresponding to increasing magnitudes of said same axis deflection signal, each one of said levels of attenuation being initiated at a different preselected value of said same axis deflection signal, and a plurality of off-axis correction circuits, each one of which is coupled to a separate one of said attenuator network, said off-axis correction circuits coupled to respond to increasing values of the other coordinate axis deflection signal by independently reducing, in predetermined steps, each of said preselected values of said same axis deflection signal required to initiate said attenuation levels so as to attenuate further said same axis deflection signal as a function of the increase of said other coordinate axis deflection signal.

2. The combination in accordance with claim 1 wherein said attenuator networks of said on-axis correction means each include a resistor and a unidirectional conducting device.

3. The combination in accordance with claim 2 wherein said off-axis correction circuits includes means for backbiasing said unidirectional conducting devices to preselected magnitudes of voltages corresponding substantially to said preselected values, and means for applying said same axis deflection signal to said attenuator networks in opposition to said backbiasing voltages to turn on said diodes successively as said same axis deflection signal reaches said preselected values.

4. The combination in accordance with claim 3 wherein said backbiasing means in said off-axis correction circuits include a plurality of variable gain amplifiers, and means for applying said coordinate axis deflection signal to each of said variable gain amplifiers to change the gains of said amplifiers in different predetermined steps as a function of said coordinate axis deflection signal so as to change said backbiasing voltages in predetermined steps.

5. The combination in accordance with claim 4 wherein said variable gain amplifiers each include a transistor having an input base electrode for receiving said coordinate axis deflection signal, an emitter electrode having a plurality of gain determining resistors coupled thereto with each of said resistors shunted by a diode to short out said resistors when activated to conduct so as to increase the gain of said amplifier in predetermined steps, and an output collector electrode coupled to a corresponding attenuator network to back bias the unidirectional conducting diode in said network to voltage values exhibited by said amplifier in said predetermined steps.

References Cited

UNITED STATES PATENTS

| | | | |
|---|---|---|---|
| 3,205,377 | 9/1965 | Nix | 315—24 X |
| 3,309,560 | 3/1967 | Popodi | 315—24 |
| 3,435,278 | 3/1969 | Carlock et al. | 315—24 |

RICHARD A. FARLEY, Primary Examiner

T. H. TUBBESING, Assistant Examiner

UNITED STATES PATENT OFFICE

CERTIFICATE OF CORRECTION

Patent No. 3,512,039 Dated May 12, 1970

Inventor(s) Richard J. Klensch

It is certified that error appears in the above-identified patent and that said Letters Patent are hereby corrected as shown below:

Column 1, line 72, "at" should read ---as---. Column 2, line 58, "reproduction" should read ---reduction---. Column 4, line 25, "acthode" should read ---cathode---. Column 5, line 39, after "point 122" insert ---follows this rise. Thus, regardless of the polarity of the input signals applied to the converter 114, a unidirectional or unipolar output signal is derived from the junction point 122.---.

SIGNED AND SEALED FEB 9 1971

(SEAL)
Attest:

Edward M. Fletcher, Jr.
Attesting Officer

WILLIAM E. SCHUYLER, JR.
Commissioner of Patents